US006210719B1

(12) United States Patent
de Lang et al.

(10) Patent No.: US 6,210,719 B1
(45) Date of Patent: *Apr. 3, 2001

(54) YOGURT FLAVOR COMPOSITION

(75) Inventors: Peter de Lang, Rotterdam; Walter Maurits M. Verhue, Oostvoorne, both of (NL)

(73) Assignee: Van den Bergh Foods Co., division of Conopco, Inc., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/724,456

(22) Filed: Oct. 1, 1996

(30) Foreign Application Priority Data

Oct. 2, 1995 (EP) .................................................. 95202640

(51) Int. Cl.$^7$ .............................. A23C 9/12; A23C 17/00
(52) U.S. Cl. .................................. 426/41; 426/9; 426/34; 426/42; 426/43
(58) Field of Search ................................. 426/41, 43, 34, 426/42, 9

(56) References Cited

U.S. PATENT DOCUMENTS

| | | | | |
|---|---|---|---|---|
| 2,465,905 | * | 3/1949 | Meade et al. ................................ | 99/9 |
| 5,055,309 | * | 10/1991 | Saita et al. .............................. | 426/34 |
| 5,096,718 | * | 3/1992 | Ayres et al. ............................... | 426/9 |
| 5,108,766 | * | 4/1992 | Gelinas et al. ........................ | 426/43 |
| 5,260,061 | * | 11/1993 | Ayres et al. ........................... | 424/115 |
| 5,693,788 | * | 12/1997 | Mandai . | |

FOREIGN PATENT DOCUMENTS

| | | | |
|---|---|---|---|
| 124996 | 11/1984 | (EP) . | |
| 233565 | 8/1987 | (EP) . | |
| 426210 | 5/1991 | (EP) . | |
| 0 426 210 A2 * | 5/1991 | (EP) ................................ | A23L/1/23 |
| 483888 | 5/1992 | (EP) . | |
| 0 483 888 A2 * | 5/1992 | (EP) ................................ | A23L/1/23 |
| 51/84326 | 7/1993 | (JP) . | |
| 95/0289 | 8/1982 | (SU) . | |

OTHER PUBLICATIONS

Gaafar et al. Internationl Journal of Food Science and Technology 27:87–91, 1992.*
European Search Report No. EP 96 20 2626 dated Feb. 21, 1996.
European Search Report No. EP 96 20 2626 dated Oct. 29, 1996.

* cited by examiner

*Primary Examiner*—Marianne P. Allen
*Assistant Examiner*—Mary K Zeman
(74) *Attorney, Agent, or Firm*—Milton L. Honig

(57) ABSTRACT

Flavor composition suitable for imparting a yogurt flavor to a food product and obtained by fermentation, characterised by a flavor so concentrated that the composition should be diluted at least 2 times, preferably at least 10 times, more preferably at least 50 times to equal the flavor of regular yogurt, which can be obtained by a process, characterised by the following steps a. fermenting a cheese whey containing medium with a bacterium belonging to the genus Propionibacterium,
   b. pasteurising the fermentation broth,
   c. fermenting the pasteurised broth with a yeast preferably one which is unable to ferment lactose,
   d. pasteurising the fermentation broth,
   e. optionally adding diacetyl.

12 Claims, No Drawings

YOGURT FLAVOR COMPOSITION

The present invention is related to the preparation of a fermentation mixture which is suited for imparting a yogurt flavour to a foodstuff, to foodstuffs flavoured with that mixture and to a process for preparing the flavour mixture.

STATE OF THE ART

Yogurt is considered an attractive food ingredient on account of its naturalness and its agreeable taste. A foodstuff can be imparted a yogurt flavour by incorporating less or more yogurt into the foodstuff. However, by processing of the foodstuff and by progress of time during storage the yogurt flavour gradually vanishes. Adding extra yogurt for enhancing the yogurt flavour often is not a solution because it changes the consistency of the food and is for many purposes relatively expensive.

Concentrated yogurt flavour is on the market, but this is a product with synthetic acetaldehyde as the major active principle. Presently many consumers prefer foodstuffs which are prepared with natural ingredients.

STATEMENT OF INVENTION

A fermentation product has been found which is suitable for imparting a yogurt flavour to a food product and which is characterised by a flavour so concentrated that the composition should be diluted at least 2 times, preferably at least 10 times, more preferably at least 50 times to equal the flavour of regular yogurt. The yogurt flavour is obtainable by a two step fermentation of a dairy product. A lactate containing fermentation medium is subjected to the fermentative activity of consecutively a Propionibacterium strain and a yeast.

DETAILS OF THE INVENTION

The yogurt flavour composition of the invention can be obtained by a process comprising the following steps
   a. fermenting a bacterium belonging to the genus Propionibacterium on a lactate containing fermentation medium, preferably cheese whey,
   b. removing microbial activity from the fermentation broth,
   c. fermenting the treated broth with a yeast,
   d. removing microbial activity from the fermentation broth.

The microorganism used for the first fermentation step is a bacterium of the genus Propionibacterium. Preferably strains of the species *freudenreichii* are used and more preferably of the subspecies *shermani*. These are common food-grade microorganisms which are readily available from culture collections.

For the second step a yeast is used which, preferably, is unable to ferment the milk sugar lactose and, more preferably, is a dairy yeast or a bakers' yeast such as *Saccharomyces cerevisiae*.

The cheese whey which is preferably used as the fermentation medium is the common whey which remains after curd precipitation. Alternatively, a whey containing fermentation medium can be prepared by dissolving dried whey powder in an aqueous medium. The medium further contains the usual ingredients for growing the above types of microorganisms, including sodium lactate, yeast extract, manganese sulphate and phosphate buffer.

Subjecting the yeast to a freezing and thawing cycle may enhance its activity. Similarly by mechanical disruption of the yeast cells endocellular enzymes may get better exposed to their substrate.

The yeast is inoculated in the fermented medium after removal of microbial activity, preferably by a pasteurisation treatment in order to inactivate the Propionibacterium organisms. The ingredients composition of the pasteurised broth has to be adjusted to the usual conditions for growth of yeast. The pH is set at a value of 5.5.

The Propionibacterium fermentation normally takes approximately 70 hours, preferably at a temperature of about 30° C.

The subsequent fermentation step with yeast normally takes 3–5 hours, at a temperature of 20°–'° C., preferably at 35° C. The final broth may be used as such, suitably after stabilisation by a pasteurisation treatment. It is advantageous to capture during such pasteurisation treatment escaped volatile flavours by e.g. a "cold finger" condenser and to recirculate the condensate to the cooled pasteurised broth. The obtained fermention broth gives out a yogurt flavour, which is so strong that the composition has to be diluted at least 2 times, preferably at least 10 times and more preferably even at least 50 times to equal the flavour of regular yogurt.

It is not necessary that after each fermentation step the microorganisms are actually removed, e.g. by filtration or centrifugation. Provided the broth is pasteurized, the inactivated microorganisms are normally kept in the broth and remain in the final flavour composition.

For rounding up the taste of the yogurt flavour composition flavour compounds may be added, such as acetic acid, 2,3-pentanedione and, preferably, diacetyl. Such compounds, preferably, are obtained by a fermentation process, so that the whole yogurt flavour composition can be labeled as natural.

The optimum amount of diacetyl is easily established by trying and tasting. Preferably the diacetyl content is balanced with acetaldehyde a characteristic ingredient of yogurt flavour. The yogurt flavour composition is admixed with such amount of diacetyl that the (wt./wt.) ratio diacetyl:acetaldehyde preferably is 1:5 to 1:30 and, more preferably, 1:9 to 1:11.

A suitable process for preparing natural diacetyl is e.g. the two-step fermentation process disclosed in EP 0 483 888 comprising
   a. fermenting a cheese whey containing medium with *Propionibacterium freudenreichii*, subsp. *shermani*,
   b. pasteurising the fermented liquid,
   c. fermenting the pasteurised liquid with a lactic acid bacterium,
   d. removing the microbial activity from the fermentation liquid, e.g. by pasteurisation, centrifugation or filtration.

The volatile diacetyl, preferably, is added in the form of the fermentation liquid in which it has been prepared. In order to mix the proper amounts, first the concentrations of acetaldehyde and of diacetyl have to be established by common standard procedures.

The present invention provides a food composition by incorporating a highly concentrated yogurt flavour. By adding 0.1–10, preferably only 0.2 –1.0 wt. % of the flavouring composition an agreeable yogurt flavour is imparted to a foodstuff.

Foodstuffs flavoured by the invented yogurt flavour composition are comprised too by the invention.

The use of Propionibacterium strains in the first process step necessarily causes the formation of slight amounts of propionic acid, which as such is a harmless substance, but which presence in the product serves as an indicator of the method of preparation. Flavouring with regular yogurt does not introduce any propionic acid into a foodstuff. Therefore a yogurt flavour composition containing at least 0.1 wt. % of propionic acid forms part of the invention and in the same way a foodstuff in which a yogurt flavour has been incorporated and which contains at least 0.001 wt. % of propionic acid forms part of the invention.

The invention is illustrated by the following examples:

EXAMPLE 1

This example was performed with a strain of *Propionibacterium freudenreichii* subspecies shermani (ATCC 9617) for the first part of the fermentation and with a *Saccharomyces cerevisiae* yeast for the second part.

First Part:

A 10 litre fermenter (ex Applicon, Schiedam, NL) was filled with 7 l of a culture medium consisting of:

| | |
|---|---|
| whey powder | 30 g/l |
| sodium lactate | 20 g/l |
| yeast extract (PTK) | 7.5 g/l (ex Ohly, Germany) |
| $MnSO_4$ | 0.005 g/l |
| $K_2HPO_4$ | 4.6 g/l |
| $KH_2PO_4$ | 10.0 g/l |

The culture medium was sterilized at 120° C. during 20 min. The culture medium was inoculated with an inoculum of the Propionibacterium strain which was prepared from a stab, by culturing the microorganism overnight in a stoppered flask in 150 ml of Lactic Broth without agitation and at 30° C. This first fermentation proceeded in two phases, an anaerobic phase, followed by an aerobic phase. The anaerobic phase was initiated by inoculation of the fermenter with the overnight inoculum. Anaerobiosis was ensured by sparging with nitrogen gas. This phase was continued during 52 hours at 30° C. under mild agitation. The pH was kept at 6.5 by addition of a (4 mole/l) sodium hydroxide solution.

The aerobic phase was initiated by replacing the nitrogen sparging gas with air (1.5 l/min) at a stirring rate of 900 rpm. At three times during the aerobic phase 200 ml of (60% w/v) sodium lactate solution (ex CCA biochem, Gorinchem, NL) was added to the fermenter.

This aerobic phase was stopped after 18 hours of fermentation by pasteurising the fermenter contents at 85° C. during 5 min.

Second Part: A bakers' yeast (*Saccharomyces cerevisiae*) suspension was prepared by suspending 10 g of commercial dried baker's yeast ("Fermipan"™, obtained from Gist Brocades, Delft) in 90 ml of physiological salt solution, centrifuging the suspension once in a Sorvall™ centrifuge (5000 rpm, 10 min), and resuspending the pellet in physiological salt solution to an optical density at 610 nm of 50.

The fermentation was carried out in a Büchi Rotavapor™ provided with a cold finger condenser.

The roundflask of this apparatus was filled with 75 ml of the fermentation broth, obtained in the first part, which had previously been adjusted to pH 5.5 with lactic acid. The temperature of the water bath was 35° C. The cold finger condenser was filled to half its volume with a mixture of ethanol and solid $CO_2$.

The yeast suspension (25 ml), optionally after thawing from a frozen condition, was added to the flask containing the pasteurised broth of the first part. The flask was immediately attached to the Rotavapor apparatus and a light vacuum was installed by letting a vacuum pump run shortly and then closing the air valve of the Rotavapor. The reaction proceeded during 3 hours at 35° C. Volatile flavour components escaping from the fermenation broth were captured with the cold finger condenser of the Rotavapor. After 3 hours the temperature of the water bath was increased to 85° C. and kept at this temperature during 5 minutes in order to pasteurize the reaction mixture. After these 5 minutes, the waterbath was emptied and the water replaced with ice-water, to cool the reaction mixture. The materials collected with the cold finger condenser were recombined with the pasteurized and cooled fermentation product. The flavour mixture was preserved by freezing at 20° C.

EXAMPLE 2

Flavoured Foodstuff

A 70% fat spread was prepared containing the ingredients indicated in Table I. The pH of the waterphase was 4.0. The waterphase was divided in 4 equal parts of 900 g, to which either 0, 15, 22.5 or 30 ml of the thawed flavour mixture of example 1 was added. The spreads I, II, III and IV, respectively, were processed and stored for 2 days at 15° C. after which they were tasted by a panel. Despite the addition of a substantial amount of yogurt, yogurt flavour was hardly noticed in the product to which no fermentation mixture had been added. The other products had an agreeable yogurt taste which was more frequently noticed in the products to which more of the mixture had been added.

TABLE I

| Spread product | Spread I | Spread II | Spread III | Spread IV |
|---|---|---|---|---|
| Fat phase | 70% | 70% | 70% | 70% |
| Water | 19.7% | 19.6% | 19.5% | 19.45% |
| Fat-free yogurt | 10% | 10% | 10% | 10% |
| Salt | 0.3% | 0.3% | 0.3% | 0.3% |
| Thawed product of example 1 | 0% | 0.1% | 0.2% | 0.25% |
| Acetic acid | 50 ppm | 50 ppm | 50 ppm | 50 ppm |
| Diacetyl | 1.5 ppm | 1.5 ppm | 1.5 ppm | 1.5 ppm |
| Organoleptic assessment (n = 7) | full taste, low yogurt taste, low acid, sweet, creamy, dairy, high diacetyl | acid, fresh, less acid, dairy, more taste, yogurt, fuller | acid fresh, less yogurt, more acid, sharp, somewhat yogurt, yogurt, strong acid | yogurt, acid, less harsh, strong acid, dairy, yogurt |

What is claimed is:

1. A process for preparation of a yogurt flavour composition comprising the following steps:
   a. fermenting a bacterium belonging to the genus Propionibacterium on a lactate containing fermentation medium to produce a fermentation broth,
   b. removing substance with enzymatic activity from the fermentation broth,
   c. subjecting the fermentation broth to enzymatic activity from yeast cells to produce a further fermentation broth,
   d. removing substance with enzymatic activity from the further fermentation broth; and
   e. obtaining a yogurt flavour composition.

2. A process for the preparation of a yogurt flavour composition according to claim 1, where the Propionibacterium strain belongs to the species *freudenreichii*.

3. A process for the preparation of a yogurt flavour composition according to claim 1, wherein the yeast is unable to ferment lactose and is a strain of the bakers' yeast *Saccharomyces cerevisiae.*

4. A process for the preparation of a yogurt flavour composition according to claim 1 wherein the yeast has been subjected to a freezing and thawing cycle before fermenting the treated broth.

5. A process according to claim 1, wherein flavour compounds are admixed during the process and chosen from the group consisting of diacetyl, acetic acid and 2,3-pentanedione.

6. A process for the preparation of a yogurt flavour composition according to claim 5, wherein the yogurt flavour composition is admixed with an amount of diacetyl that the (wt./wt.) ratio diacetyl: acetaldehyde is 1:5 to 1:30.

7. A process for the preparation of a yogurt flavour composition according to claim 5, wherein the diacetyl is added in the form of the fermentation liquid in which it has been prepared.

8. A process in accordance with claim 1, wherein escaped volatile flavors are captured by a cold finger condenser during pasteurization and recirculated as a condensate to the pasteurized broth.

9. A yogurt flavor composition prepared by a process comprising the following steps:
   a. fermenting a bacterium belonging to the genus Propionibacterium on a lactate containing fermentation medium;
   b. inactivating microbial enzyme activity by pasteurization;
   c. fermenting the treated broth with a yeast;
   d. inactivating microbial enzyme activity by pasteurization; and
   e. obtaining a yogurt flavor composition.

10. A yogurt flavour composition according to claim 9 containing at least 0.1 wt. % of propionic acid.

11. A composition in accordance with claim 9, wherein the Propionibacterium strain belongs to the species *freudenreichii.*

12. A composition in accordance with claim 9, wherein said yeast is *Saccharomyces cerevisiae.*

* * * * *